United States Patent
Hartmann (10) Patent No.: US 6,588,703 B1
(45) Date of Patent: Jul. 8, 2003

(54) PASSIVE AERODYNAMIC SONIC BOOM SUPPRESSION FOR SUPERSONIC AIRCRAFT

(75) Inventor: Tom Hartmann, Santa Clarita, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/499,654

(22) Filed: Feb. 8, 2000

(51) Int. Cl.⁷ .................................................. B64C 3/10
(52) U.S. Cl. ..................................... 244/35 R; 244/1 N
(58) Field of Search ........................... 244/1 N, 53, 15, 244/54, 55, 34 A, 35 R, 36

(56) References Cited

U.S. PATENT DOCUMENTS

| | | | |
|---|---|---|---|
| 1,786,472 A | * 12/1930 | Yates | 244/35 R |
| 2,916,230 A | * 12/1959 | Nial | 244/15 |
| 3,137,460 A | * 6/1964 | Owl et al. | 244/53 |
| 3,677,502 A | * 7/1972 | Tupolev et al. | 244/119 |
| 4,114,836 A | * 9/1978 | Graham et al. | 244/1 N |
| 4,436,261 A | 3/1984 | Koleff | |
| 4,582,276 A | 4/1986 | Gerhardt | |
| 4,598,886 A | * 7/1986 | Friebel et al. | 244/15 |
| 4,867,394 A | 9/1989 | Patterson, Jr. | |
| 5,289,995 A | 3/1994 | Greene | |
| 5,443,230 A | 8/1995 | Lord et al. | |
| 5,518,204 A | 5/1996 | Tracy | |
| 5,529,263 A | * 6/1996 | Rudolph | 244/15 |
| 5,740,984 A | * 4/1998 | Morgenstern | 244/1 N |
| 5,899,413 A | * 5/1999 | Hager et al. | 244/119 |
| 5,934,607 A | * 8/1999 | Rising et al. | 244/1 N |

OTHER PUBLICATIONS http://www.dfrc.nasa.gov/PAO/PAIS/HTML/FS–044–DRFC.html, "F–8 Supercritical Wing" .*
http://users.chariot.net.au/theburfs/Ursst.html,"Boeing 2707–200 SST" .*
AeroVision 2000 New Technology for the New Millenium, http://aerospace. nasa.gov/library/aerovision, Oct. 5, 1999, slide 3 of 15.*
Hyper–X Geometry and data sheet, http://www.boeing.com/phantom/hyperx.html.*
Jane's All the Worlds Aircraft 1999–2000 "Advanced Supersonic Airliner", whole article, from web subscription.*
http://users.chariot.net.au/the~burfs/Ursst.html.*
Seebas, Richard and George, A.R.; "Sonic–Boom Minimization." Journal of the Acoustic Society of America, vol. 51, No. 2, Pt. 3, Feb. 1972, pp 686–694.

(List continued on next page.)

Primary Examiner—Peter M. Poon
Assistant Examiner—Timothy D. Collins (57) ABSTRACT

Sonic boom suppression apparatus for an aircraft including a nose portion having convex upper surfaces and a flat underside, slotted portions on the fuselage or wings of the aircraft, shock cancellation surfaces incorporated in the engine portion of the aircraft, and area/lift distribution tailoring, all of which are preferably used concomitantly.

9 Claims, 9 Drawing Sheets

OTHER PUBLICATIONS

George, A.R.: "Reduction of Sonic Boom by Azimuthal Redistribution of Overpressure." AIAA Paper 68–159.

Darden, Christine; "Minimization of Sonic Boom Parameters in Real and Isothermal Atmospheres." NASA TN D–7842, Mar. 1975.

Darden, Christine; "Sonic Boom Minimization with Nose Bluntness Relaxation." NASA TP–1348, 1979.

Darden, Christine; et. al.; "Design and Analysis of Low Boom Concepts at Langley Research Center." First Annual High Speed Research Workshop, NASA CP–10087 Part 2; pp. 673–700, May 14–16, 1991.

Siclari, Michael; "Sonic Boom Predictions Using a Modified Euler Code." First Annual High–Speed Research Workshop, NASA CP–10087 Part 2; pp. 757–784; May 14–16, 1991.

Seebass et al., "Sonic Boom Minimization Revisited", American Institute of Aeronautics and Astronautics Inc., Jun. 15, 1998 (whole document).

* cited by examiner

PASSIVE AERODYNAMIC SONIC BOOM SUPPRESSION FOR SUPERSONIC AIRCRAFT

BACKGROUND OF THE INVENTION

1. Field of the Invention

The present invention relates generally to high-speed aircraft, and more particularly to long range supersonic cruise aircraft having sonic boom shock suppression capabilities.

2. Description of Related Art

Various techniques for reducing sonic boom by suppressing shock waves formed on or around high speed aircraft have been tried for years.

U.S. Pat. No. 5,289,995 to Greene teaches the incorporation of an internal passageway, an articulated intake structure and an articulated exhaust structure which is connected to the intake structure by the passageway. The cross-section of which is essentially the aircraft's fuselage and engine inlet combined, which helps cancel shocks from the fuselage and engine(s).

U.S. Pat. No. 4,582,276 to Gerhardt teaches incorporating a U-shaped aerodynamic structure into the design of a supersonic aircraft, with the U-shaped structure enabling cancellation of shock waves by expansion waves generated by the apices of the triangularly shaped legs of the U-shaped structure.

U.S. Pat. No. 5,740,984 to Morgenstern teaches altering the direction and shape of the shock wave by using a control device, located at or near the nose section of the aircraft, that has a control surface that can be moved between a retracted position wherein drag on the aircraft is reduced, and an extended position wherein air pressure at the nose section is increased to alter the shape of the shock wave created by the aircraft and hence the sonic boom that impacts the ground.

U.S. Pat. No. 4,114,836 to Graham et al. discloses an aircraft having plural passageways, each having its longitudinal axis substantially parallel to the flight path of the aircraft. The passageways extend through the wings, the fuselage, the horizontal elevators and the rudder for the purpose of permitting air to pass through these areas, thereby reducing drag and sonic boom.

U.S. Pat. No. 4,436,261 to Koleff discloses a sonic boom concentrator for a V/STOL aircraft in the form of a fin having curved sidewalls and truncated ends.

U.S. Pat. No. 5,518,204 to Tracy discloses a supersonic flight aircraft having a longitudinal body and a laterally extending wing, in which laminar airflow conditions are maintained over the leading edge and adjacent the surface of the wing.

As a rule, the foregoing techniques can be categorized as shock cancellation, area/lift distribution tailoring, shock directionality alteration, and slotted edges. Each technique enables sonic boom control and/or wave drag reduction. However, each concept independently has limitations that preclude the development of a feasible "shock free" vehicle.

Figure 1:
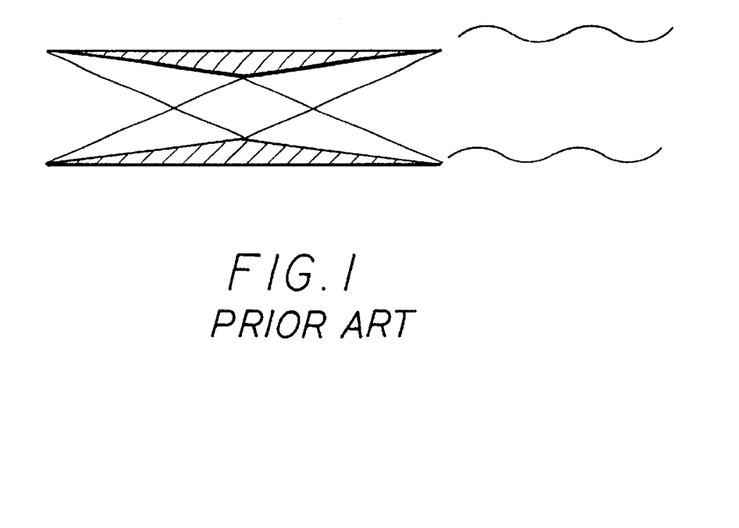
FIG. 1 is a diagram illustrating structure that facilitates shock cancellation.

In addition to the published patents, the issue of reducing drag and sonic boom associated with supersonic aircraft has been the subject of research at certain universities. One such program by George and Seebass' involved tho theory for tailoring the area and lift distribution verses length to monimize the sonic boom shock strength at the ground. Another such program involves the development of a two-dimensional shock canceling model proposed by Busemann in 1935, as illustrated in FIG. 1. Finally, George examined redirecting boom laterally and showed how to calculate a directionally altered boom reduction underneath a vehicle that persists into the far-field.

The foregoing techniques can be categorized as Artificially Blunted Leading Edge (ABLE), area/lift distribution tailoring, shock cancellation and shock directionality alteration. Each technique enables sonic boom control and/or wave drag reduction. However, each concept independently has limitations that preclude the development of a feasible "Low Sonic Boom" vehicle.

Against this background of known technology, the inventors have discovered that by combining techniques, the shortcomings of each can be compensated for or overcome by the benefits of others.

OBJECTS AND SUMMARY OF THE INVENTION

It is therefore an object of the present invention to provide a novel "Low Sonic Boom" high speed aircraft, utilizing various body portion orientations such as lifting bodies, flying wings, blended wings along with other such orientations as illustrated in FIGS. 4, 11a, 11b and 12a, 12b, 12c and 12d, by incorporating many of the synergistic passive shock reduction and cancellation devices or techniques, while overcoming many of the disadvantages and drawbacks associated with such devices or techniques.

Figure 8:
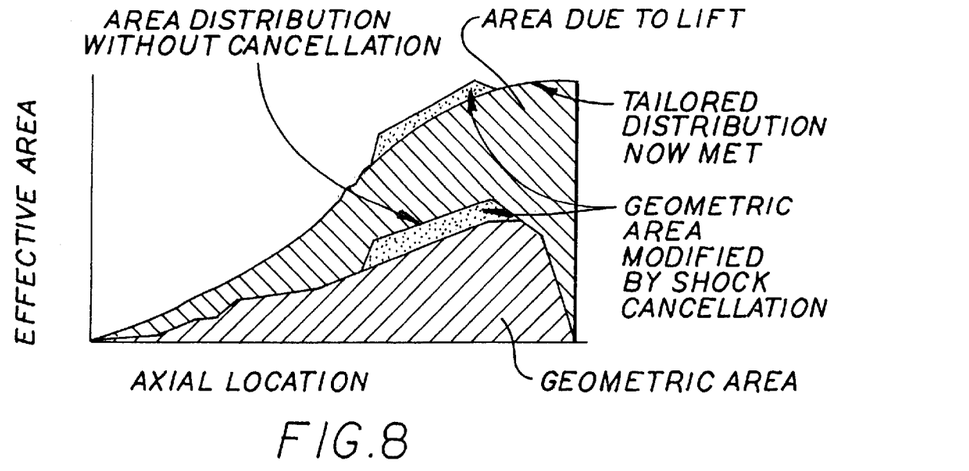
FIG. 8 shows how shock cancellation allows tailoring of area/lift distribution.
Figure 9:
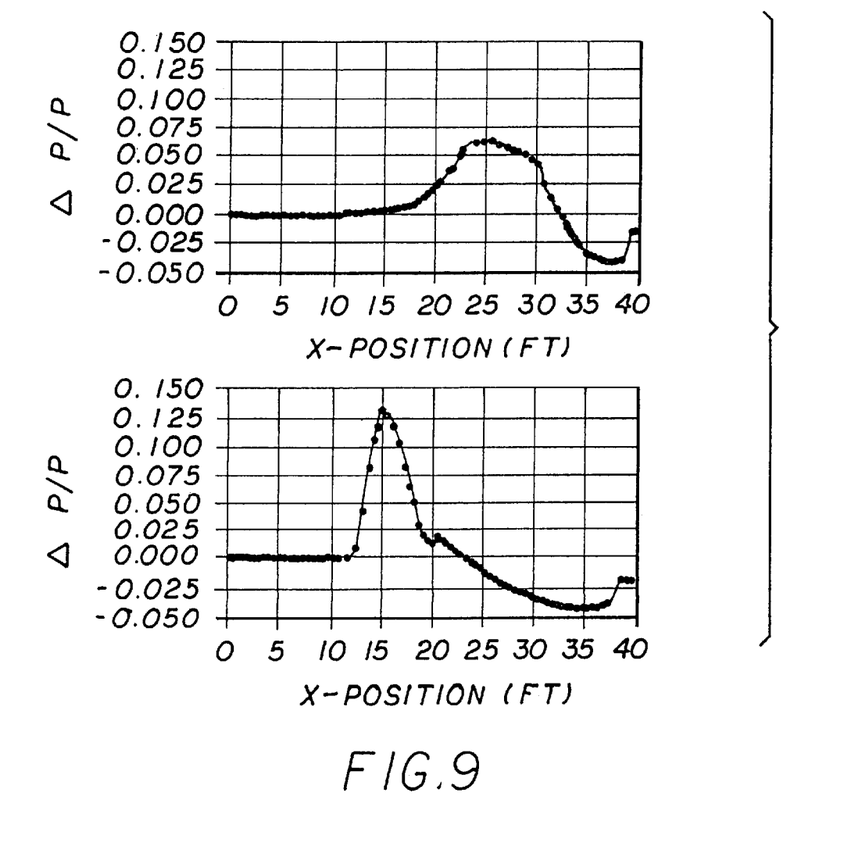
FIG. 9 illustrates computational results of the application of shock cancellation.

Another object of the present invention is to suppress sonic boom in a high speed aircraft capable of supersonic flight by incorporating shock cancellation surface configurations around engine nacelles, as illustrated in FIGS. 8 and 9, shaping the aircraft fuselage to provide shock directionality, incorporating slotted edges in the wing, body or canard of the aircraft and designing the area and lift distribution to tailor the ground shock strength and to reduce wave drag of the aircraft.

DETAILED DESCRIPTION OF THE INVENTION

The following description is provided to enable any person skilled in the art to make and use the invention, and sets forth the best modes contemplated by the inventor of carrying out his invention.

Variations, however, may be readily apparent to those skilled in the art, since only the generic principles of the present invention have been defined herein specifically to provide teachings for an aircraft configuration that encompasses many long sought after features.

The present invention uses a combination of synergistically combined techniques to achieve reduction of the sonic boom of supersonic airplanes, and in particular to achieve a reduction of sonic boom by 15–25 dBA while seducing the drag of the vehicle and maintaining a "practical design".

Figure 2:
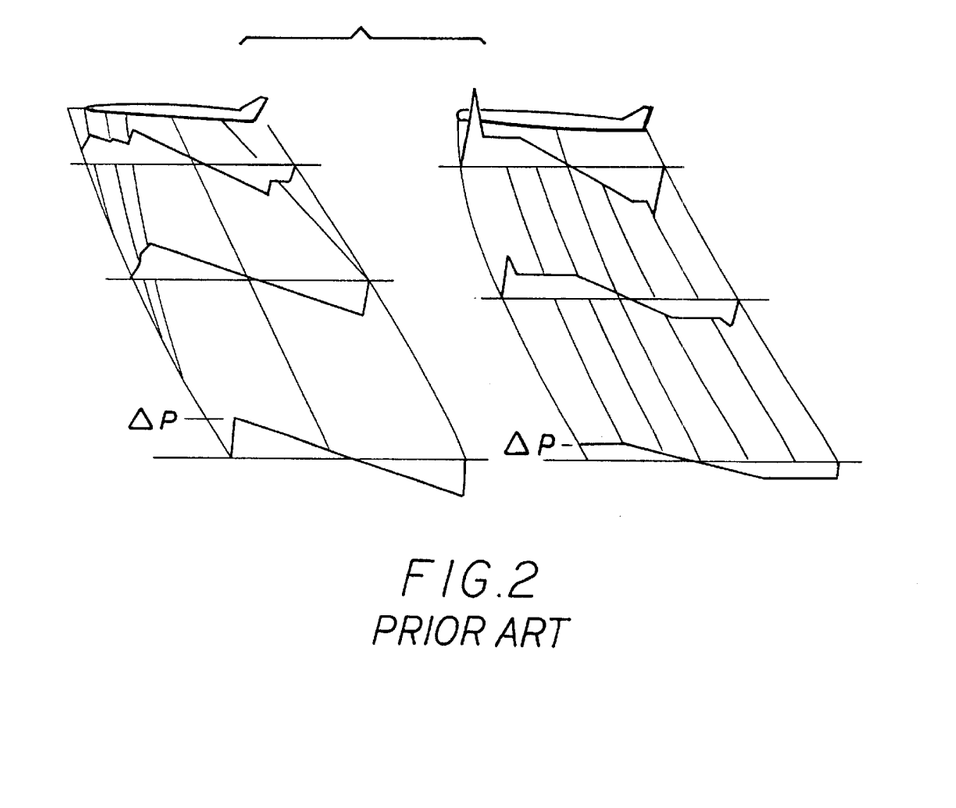
FIG. 2 is a diagram showing far-field sonic boom signature with and without passive aerodynamic sonic boom suppression.

Typically, supersonic commercial flights over land have been prohibited due to the highly annoying perceived loudness of sonic booms. Such perceived loudness is a function of the magnitude of the shock strength (change in pressure). A typical N-wave sonic boom consists of a rapid pressure jump or shock at the beginning, followed by a gradual expansion, and finally a rapid recompression shock at the end. These two shocks become amplified in magnitude due to coalescence with other shocks waves emanating from the vehicle, usually the wing and inlet/nacelle (FIG. 2). Only the shocks are audible (not gradual pressure changes), creating the two shock "boom-boom" sound characteristically associated with sonic booms. It has been determined, therefore, that to reduce the loudness of sonic booms, the size of the shocks needs to be reduced.

Figure 3:
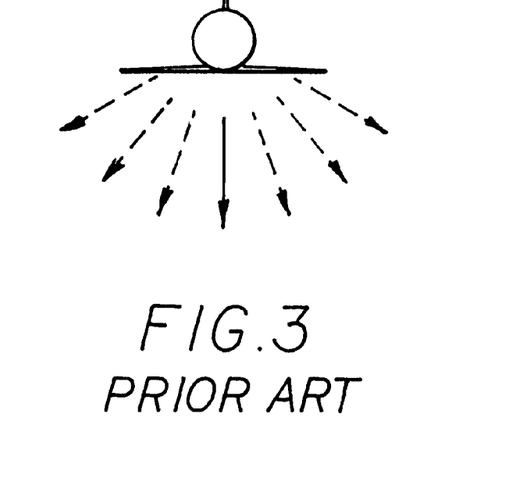
FIG. 3 illustrates George & Seebass simplified assumption.

George and Seebass[1] developed the theory for tailoring the area and lift distribution versus length to minimize the shock strength at the ground given parameters of aircraft weight, flight altitude and Mach number. To minimize the shock strength, the sum of the area and lift must exactly follow the George and Seebass distribution. Darden[3,4] implemented the theory in a computer program to automatically calculate these distributions. These provide the starting point for passive sonic boom reduction used herein. However, three characteristics of George and Seebass shock minimized distributions result in impractical airplane designs because the distributions require:

1) blunter noses than minimum drag shapes—leading to reduced performance,
2) smooth distributions through the nacelle region—not possible with existing engine designs,
3) a one-dimensional simplifying assumption—so the distributions are only calculated directly under the vehicle; and non-planer and azimuthally varying effects are not considered (FIG. 3).

Figure 4:
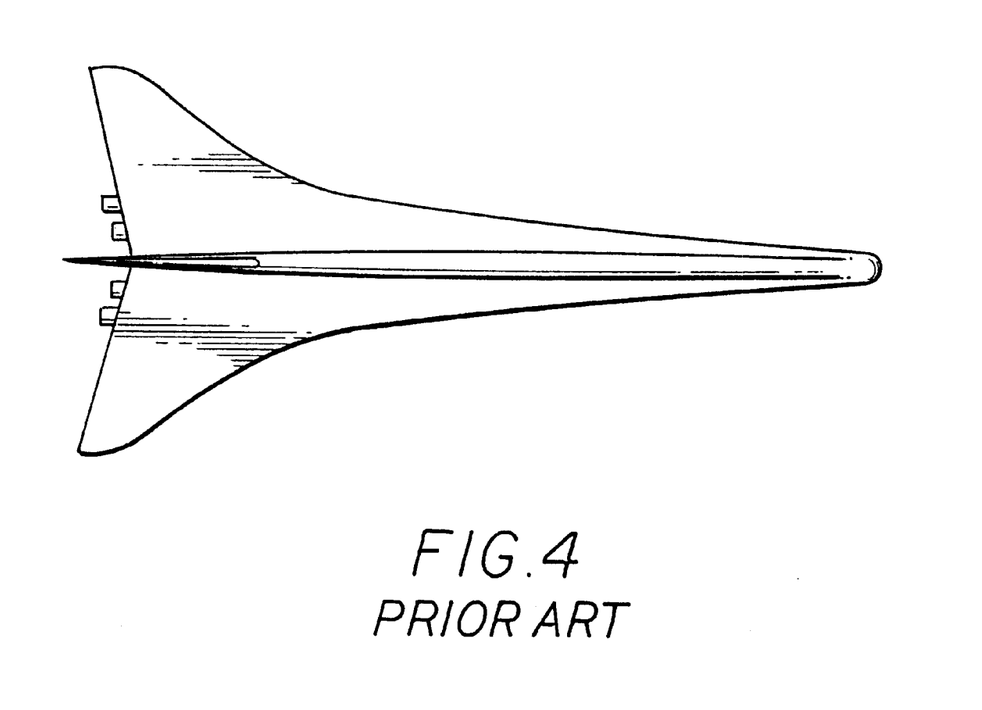
FIG. 4 illustrates a vehicle developed using George & Seebass technique.

Low sonic-boom vehicle shapes have been developed by application of this tailoring theory. One such concept is shown in FIG. 4. By the theory, this structure would appear to exhibit very low sonic boom, and suggested that significant benefits had been achieved from area/lift distribution tailoring[5]. It has been later concluded that the addition of nacelles created strong shocks underneath and the lower sweep on the outboard wing created strong shocks at azimuths off to the sides[6]. Additional techniques are necessary to suppress all shock sources of a realistic vehicle. To achieve shock minimized signatures with practical shapes, three other technologies have been combined, either individually or in combination, with area/lift distribution tailoring:

1) artificially blunted leading edges (ABLE),
2) shock cancellation,
3) non-planer shock directionality.

Area/lift tailoring with ABLE

Figure 5A:
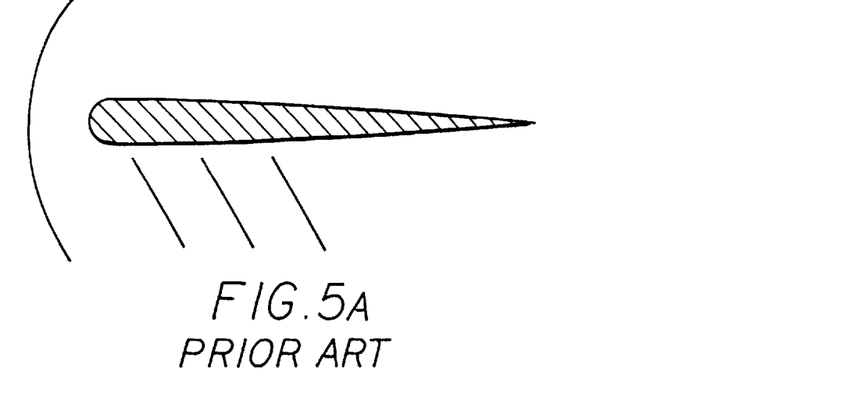
FIGS. 5a, 5b and 5c illustrate various leading edge configurations and resultant shock formations.
Figure 5B:
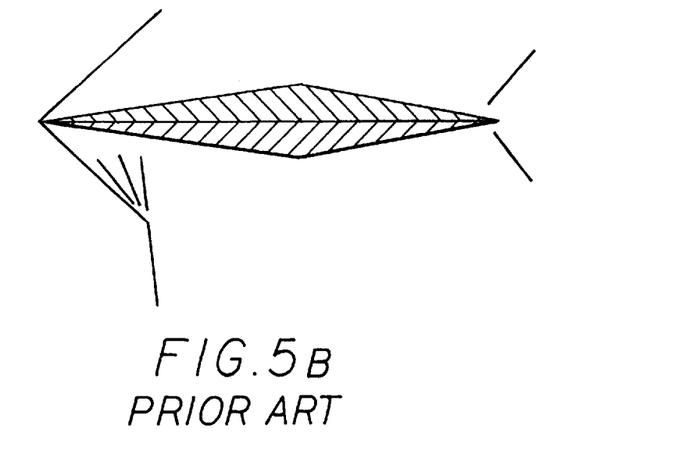
Figure 5C:
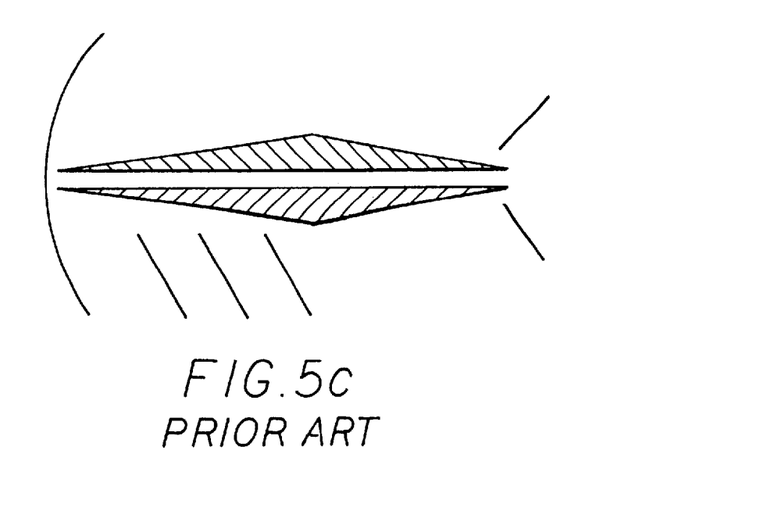

ABLE implementation to achieve shock reduction is based on earlier studies that show mid-field and far-field overpressures are minimized with a blunt leading edge (note FIG. 5a). Sharp leading edges (FIG. 5b) generate strong compressions along the vehicle that coalesce to produce a strong far-field overpressure. A blunt edge or vehicle nose creates a strong bow shock, but subsequent compressions are weak and less likely to coalesce. In addition, the dissipation with altitude of strong initial shocks is greater. High wave drag of blunt edges or noses has traditionally precluded practical applications. This has been described as the "low boom, high drag" paradox. To address this phenomenon, "slotted edge" technology has been developed which significantly reduces the drag associated with bluntnose/blunt-edge designs, as well as far-field overpressure of leading edge shocks. One embodiment of this, which is shown in FIG. 5c, takes the form of a "slot-in-wing" structure. For a significantly small channel, the choked internal flow induces a strong normal shock in front of the nose. The resultant effective blunt body produces an external flow structure similar to a conventional blunted geometry, but it is significantly lower combined pressure and friction drag. CFD has shown up to 40% reduction in drag relative to an equivalent blunt airfoil.

Figure 6A:
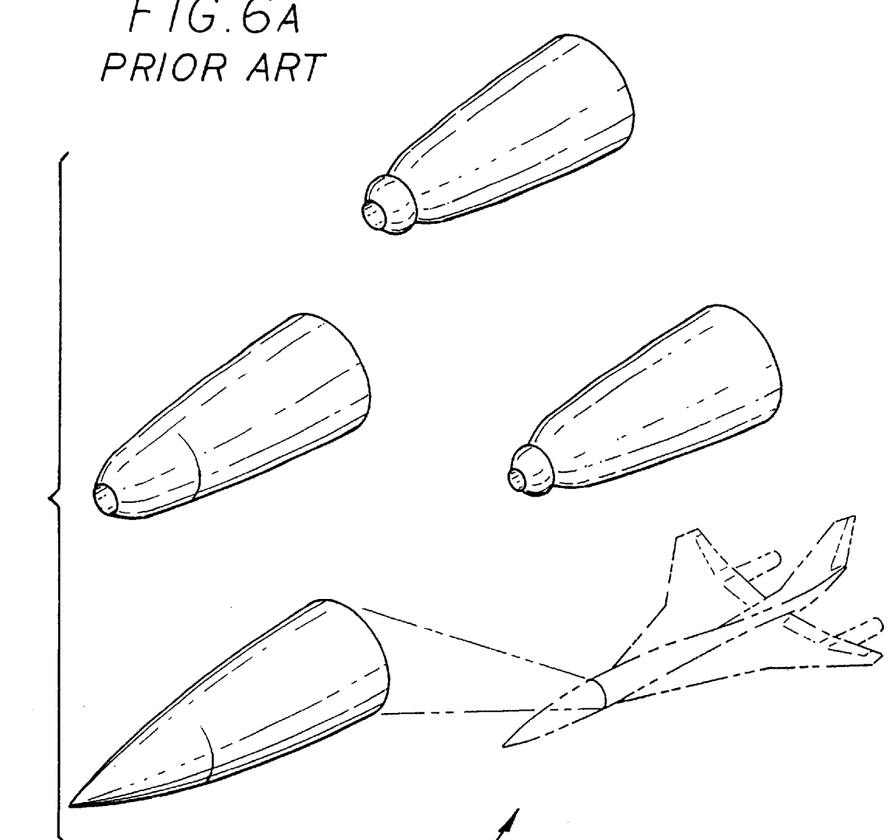
FIGS. 6a and 6b illustrate multiple Artificially Blunted Leading Edge (ABLE) nose configurations designed for a representative low boom tailored aircraft.
Figures 6A, 6B:
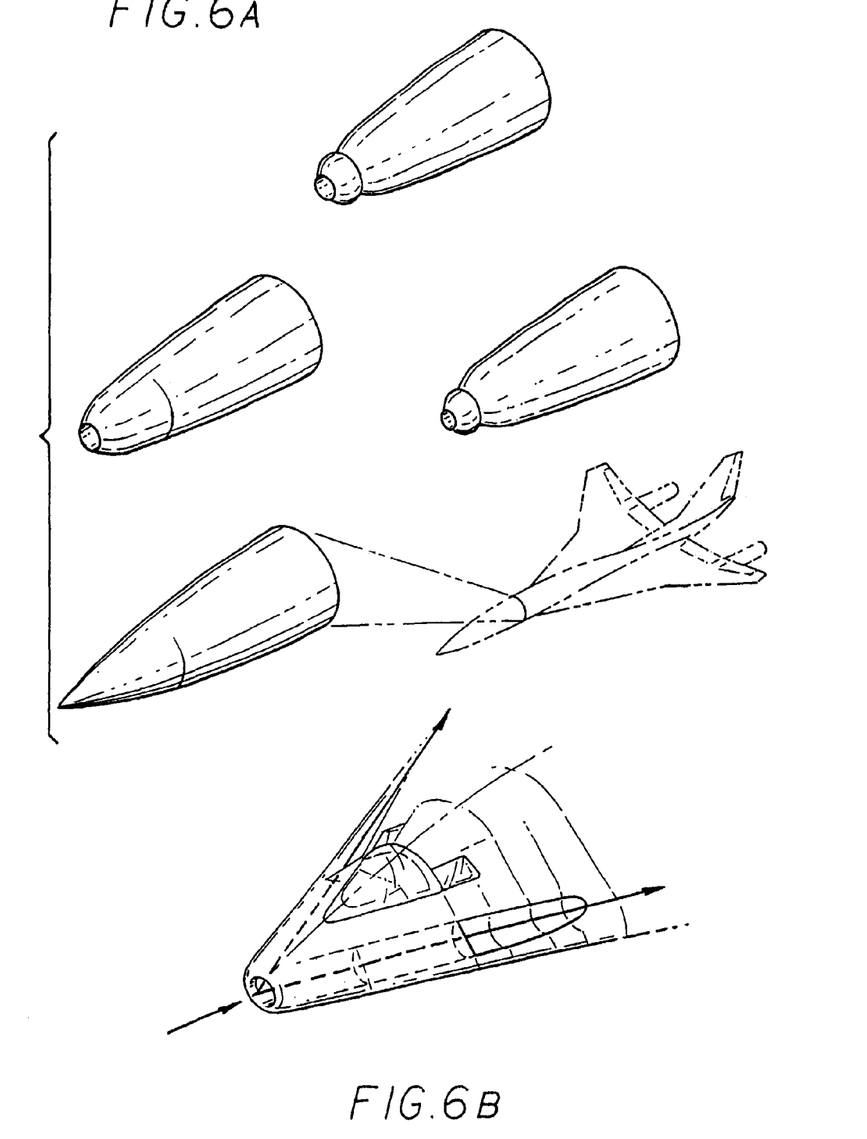
Figure 6B:
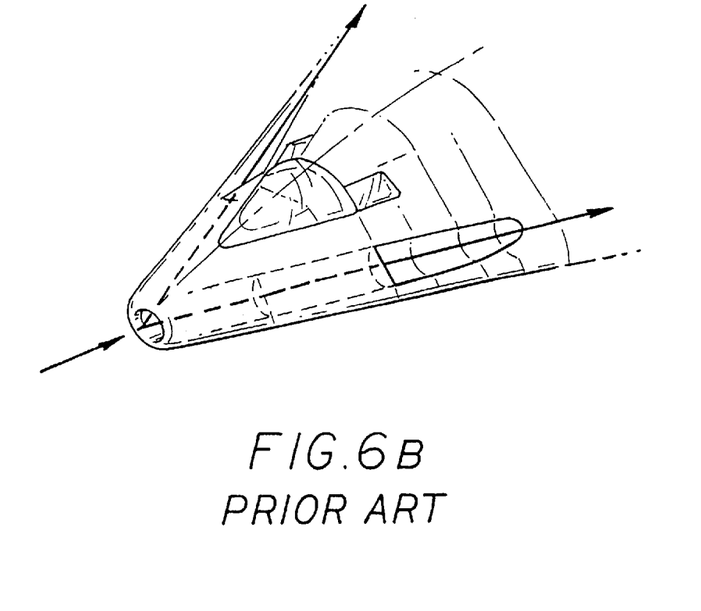

There are many ways of incorporating this "slotted edge" technique on a "Low Boom," supersonic aircraft. One method is the incorporation of the "slotted edge" along the leading edge of the wing of the aircraft. A second method is a blunted nose with slots on the fuselage. This places a normal shock inlet at the nose to generate the strong shock, usually due to bluntness, with less drag because the flow does not stagnate, instead flowing through the ABLE channel as described in Dr. Ruffin's patent application. We use the ABLE nose to satisfy the bluntness required of a tailored distribution—with lower drag levels. One embodiment of the concept would be FIG. 5c as a flying wing configuration. Possible ABLE applications to the forebody of a tailored vehicle are shown in FIGS. 6a–b (and achieved a tailored low boom successfully in NASA Ames' ballistic range). The bluntness required of a tailored distribution is fundamental to preventing shock coalescence.

Shock Cancellation

Figure 7A:
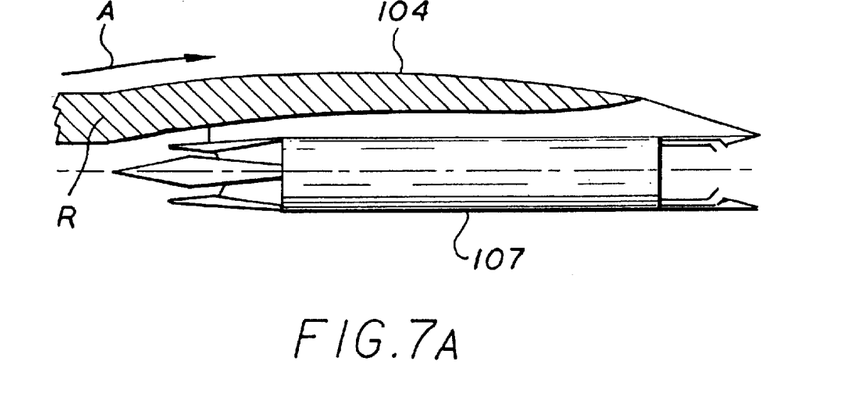
FIGS. 7a, 7b and 7c illustrate the application of Shock Cancellation to the engine nacelle integration.
Figure 7B:
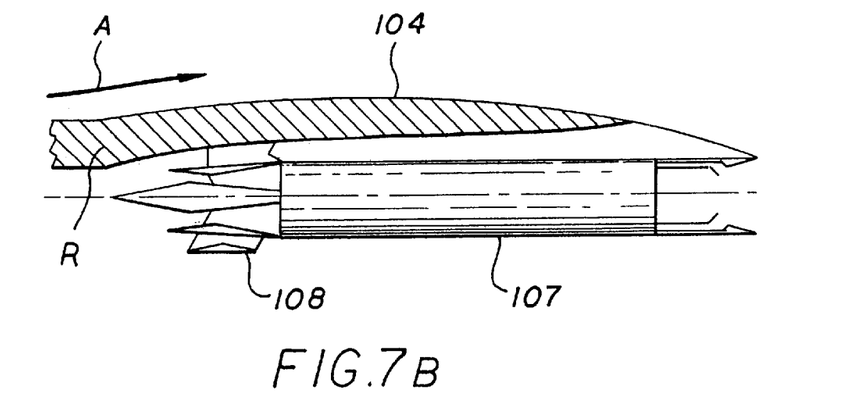
Figure 7C:
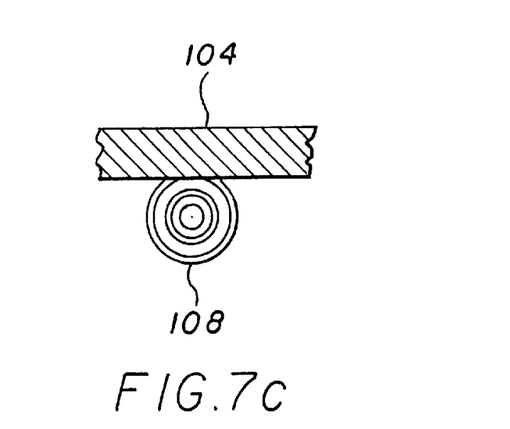

Referring now to FIG. 1, there is shown a two-dimensional shock-free environment, corresponding to a model developed by Busemann in 1935, comprising a bi-planar structure exhibiting parallel surfaces. Busemann's study helped explain how a shock-free environment of parallel surfaces leads to theoretically zero wave drag (due to volume) by shock cancellation. With the Busemann biplane at zero incidence, as shown in FIG. 1, shocks produced at the leading edges are canceled by expansions at the shoulders of the opposite surfaces. The expansion waves are then canceled by shocks at the trailing edges. The result is low wave drag, no sonic boom, and no lift. As the incidence angle is increased in order to produce lift, an undesirable shock is produced off the lower surface. This makes the Busemann bi-planer configuration impractical for a lift producing "Low Boom" supersonic aircraft. However, the Busemann structure can be incorporated on the aircraft to cancel shocks off "non lift producing" structure such as the engine nacelles. The incorporation of this concept in a nacelle shroud 108 and reflexed wing 104 is shown in FIGS. 7a–7c. FIG. 7a shows a cross-section of the wing 104 and a longitudinal section of the engine 107, with the arrow A indicating the direction of air flow. FIG. 7b is similar to FIG. 7a, except the engine 107 includes a nacelle shroud 108. FIG. 7c shows a cross-sectional view of the nacelle shroud 108 and a longitudinal section of the wing 104 for the embodiment shown in FIG. 7b. The reflexing R of the wing 104 beyond the minimum drag amount to further reduce the nacelle shock can be of further benefit for area/lift tailoring. FIG. 8 shows how shock cancellation allows the tailored area/lift distribution to be met. FIG. 9 shows how even a short shroud can greatly reduce shock strength and move the shock location farther aft, which also helps in tailoring area/lift.

Non-Planer Shock Directionality

Figure 10:
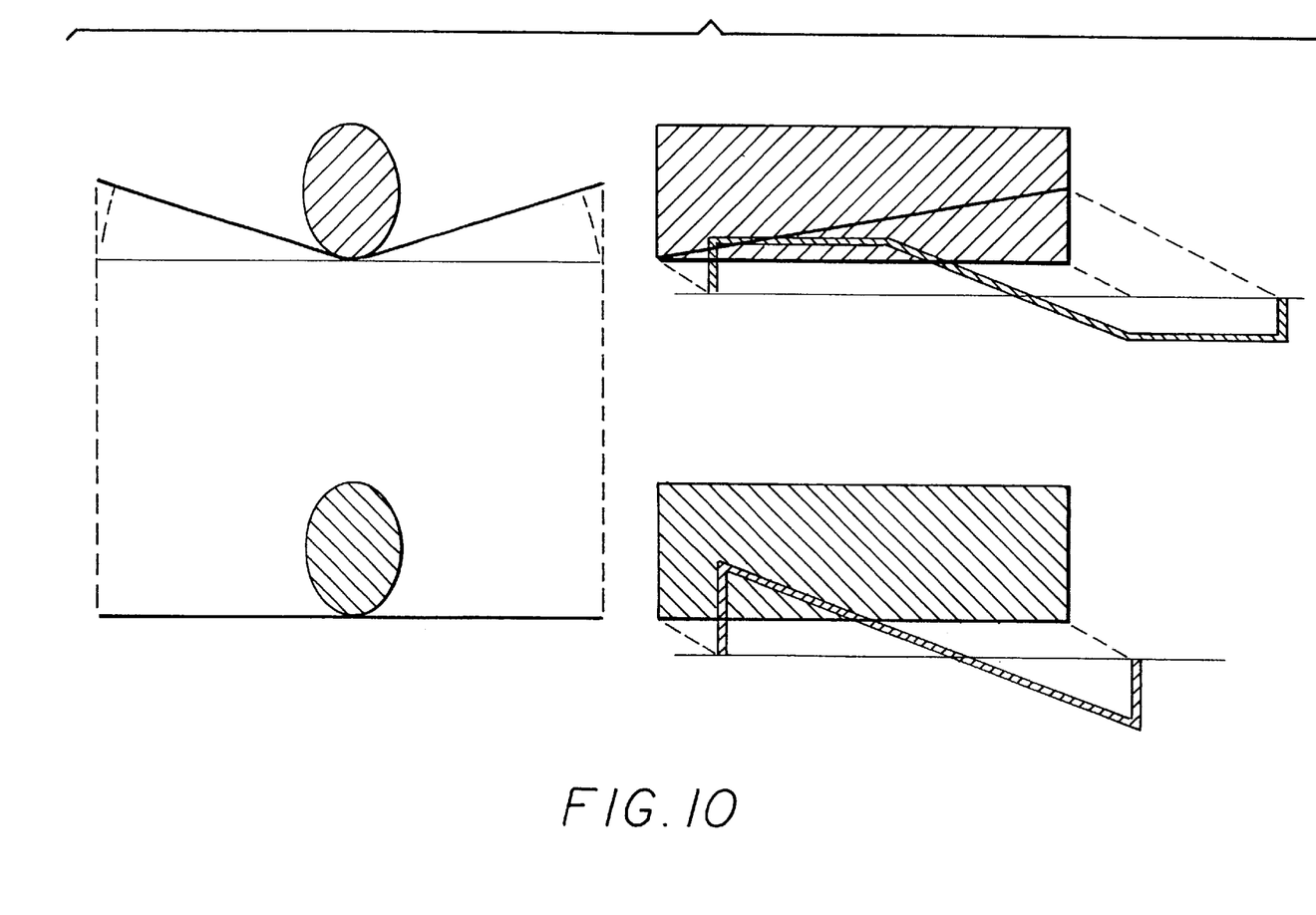
FIG. 10 illustrates the dihedral effect on shock directionality.

To aid in tailoring an area/lift distribution both the inlet/nacelle and wing shocks need to be reduced. As proposed by George[2], shock directionality can be used to reduce the wing shock due to lift. One way to reduce the lift shock is to use non-planer shock directionality through integration of the dihedral effect. With the fairly high sweep angle of the wing common to supersonic aircraft, increasing the dihedral angle has the effect of lengthening the vehicle signature and directing the shock to the sides, both of which reduce the sonic boom signature on the ground. FIG. 10 illustrates the dihedral effect and its resulting signature length stretching and proportional strength reduction, which combines to make area/lift tailoring easier for further reductions.

Figure 11A:
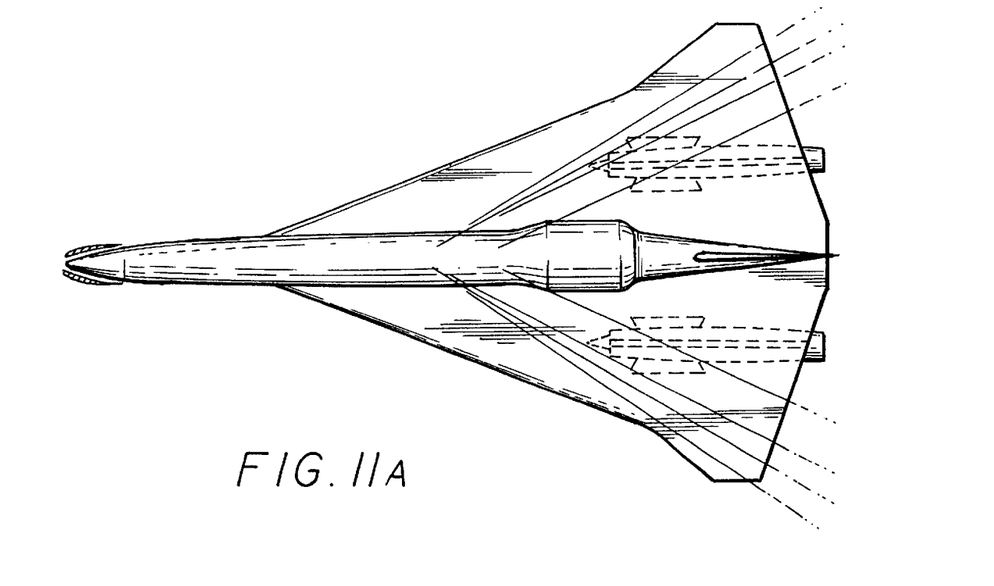
FIGS. 11a and 11b illustrate application of fuselage shaping to shock directionality.
Figure 11B:
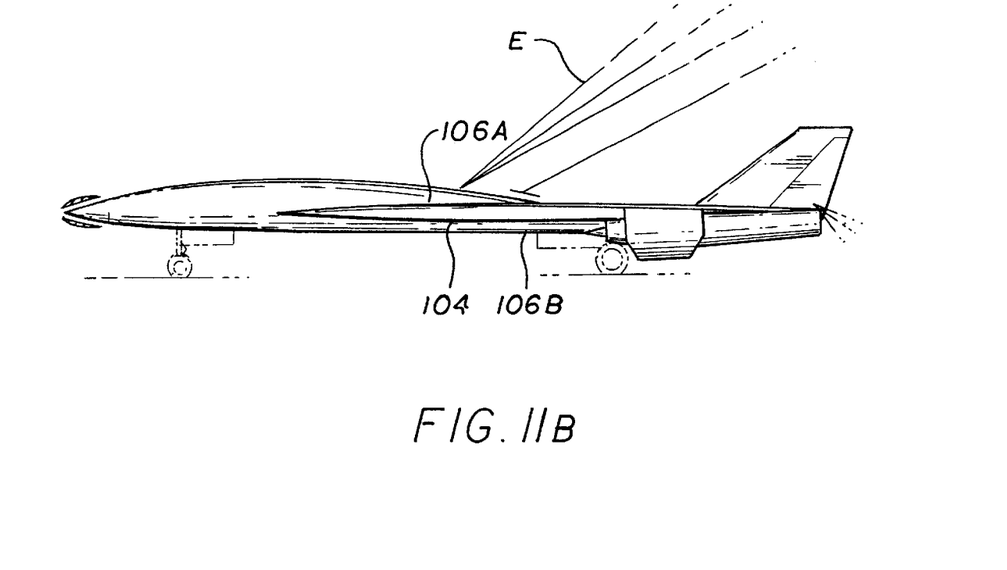

Another way to take advantage of non-planer shock directionality for lift shock reduction is to reduce the mid-body fuselage volume above the wing 106a beyond that needed for wave drag reduction without reducing it as much under the wing 106b, as shown in FIGS. 11a and 11b. This generates an expansion E that lowers the pressure above the wing 104 everywhere the expansion fan covers, increasing lift without changing the pressure under the wing 104. With this structure, the angle-of-attack needed to generate the same lift is lower which results in a reduction in pressure below the wing relative to without the structure. This reduces the lift shock, making area/lift tailoring easier. FIG. 11b also shows that by carrying lower pressure above the wing 106a relative to below the wing 106b (also known as lift) to the back end of the vehicle, the smaller expansion spike necessary to prevent aft shock coalescence in area/lift tailoring can be generated behind the trailing edge of the wing. The lower pressure on the upper surface of the wing should have its camber designed to generate this spike (shown in FIG. 2) when it spills off the back end of the wing. The camber design for the spike can be done in conjunction with the mid-body induced expansion described above. This method of generating the spike maximizes the length that can be used for area/lift tailoring, which allows achievement of the lowest ground shock strengths theoretically possible with tailoring.

FIG. 11b also shows that by carrying lower pressure above the wing relative to below the wing (also known as lift) to the back end of the vehicle, the smaller expansion spike necessary to prevent aft shock coalescence in area/lift tailoring can be generated behind the trailing edge of the wing. The lower pressure on the upper surface of the wing should have its camber designed to generate this spike (shown in FIG. 2) when it pills off the back end of the wing. The camber design for the spike can be done in conjunction with the mid-body induced expansion described above. This method of generating the spike maximizes the length that can be used for area/lift tailoring, which allows achievement of the lowest ground shock strengths theoretically possible with tailoring.

Figure 12A:
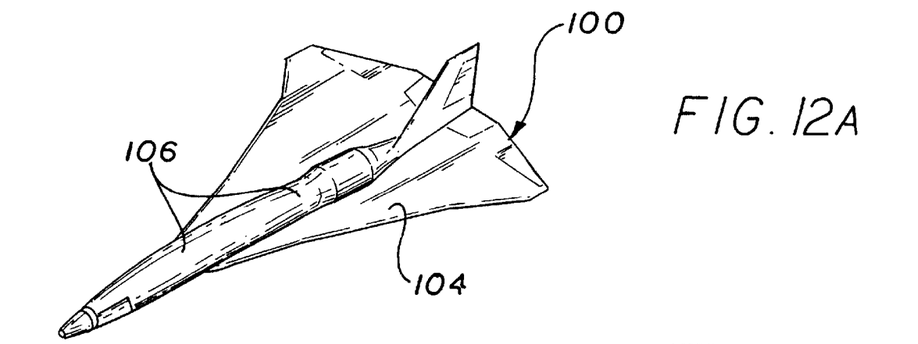
FIGS. 12a, 12b, 12c and 12d depict an aircraft incorporating structures, surfaces and configurations in accordance with the teachings of the present invention including a Artificially Blunted Nose, Area/Lift tailoring, vehicle shaping for "Shock Directionality" and nacelle shrouds for "Shock Cancellation."
Figure 12B:
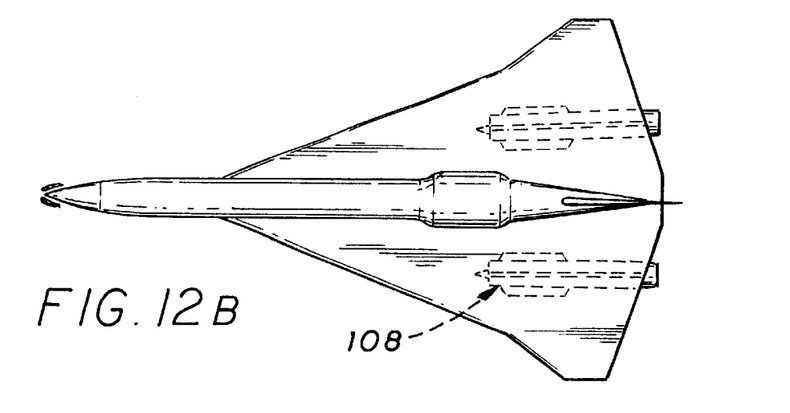
Figure 12C:
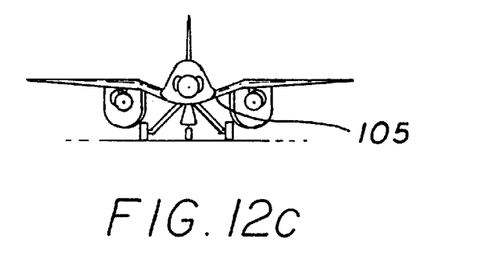
Figure 12D:
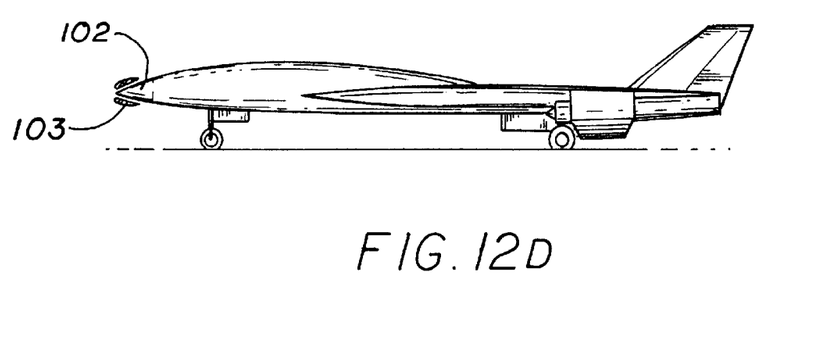

FIGS. 12c–d show an aircraft 100 constructed in accordance with the teachings of the present invention that incorporates various ones, if not all of the foregoing techniques. The nose section is seen to include an 103 ABLE blunted nose with slots for drag reduction. The wing 104, wing dihedral 105 and midbody 106 are shaped for shock directionality decreasing the lift shock strength which makes the tailored area/lift distribution easier to achieve. The lower pressure above the wing at the far aft trailing edge spills off to generate the expansion spike needed to prevent aft shock coalescence. Shock cancellation surfaces are incorporated around the engine nacelles 108 and reflexing of the wing above the nacelles. And the aircraft further incorporates area and lift distribution tailoring for additional wave drag edition and sonic boom reduction.

Those skilled in the art will appreciate that various adoptions and modifications of the invention as described above can be configured without departing from the scope and spirit of the invention. Therefore, it is to be understood that, within the scope of the appended claims, the invention may be practiced other than as specifically described herein.

REFERENCE

1. Seebass, Richard and George, A. R.; "Sonic-Boom Minimization." Journal of the Acoustical Society of America, vol. 51, No. 2, Pt. 3, February 1972, pp. 686–694.
2. George, A. R.; "Reduction of Sonic Boom by Azimuthal Redistribution of Over-pressure." AIAA Paper 68–159.
3. Darden, Christine; "Minimization of Sonic-Boom Parameters in Real and Isothermal Atmospheres." NASA TN D-7842, March 1975.
4. Darden, Christine; "Sonic Boom Minimization with Nose Bluntness Relaxation." NASA TP-1348, 1979.
5. Darden, Christine; et. al.; "Design and Analysis of Low Boom Concepts at Langley Research Center." First Annual High-Speed Research Workshop, NASA CP-10087 Part 2; pp. 673–700; May 14–16, 1991.
6. Siclari, Michael; "Sonic Boom Predictions Using a Modified Euler Code." First Annual High-Speed Research Workshop, NASA CP-10087 Part 2; pp. 757–784; May 14–16, 1991.

What I claim is:

1. An aircraft embodying shock cancellation sonic boom suppression capabilities, comprising:
   a wing including an upwardly reflexed portion defined by a cross section of the wing running rearward along a flight direction of the aircraft; and
   an engine mounted under the wing behind the reflexed portion of the wing.

2. The aircraft of claim 1, wherein the engine comprises a nacelle shroud.

3. The aircraft of claim 2, wherein the nacelle shroud is located behind the reflexed portion of the wing.

4. The aircraft of claim 1, wherein the aircraft further comprises a fuselage having a continuously decreasing volume as the fuselage extends rearward above the wing.

5. The aircraft of claim 4, wherein the fuselage has a volume rearwardly extending below the wing that is not decreased as much as the volume of the fuselage rearwardly extending above the wing.

6. An aircraft embodying shock directionality sonic boom suppression capabilities, comprising:

a fuselage; and wings extending from the fuselage, wherein the fuselage has a continuously decreasing volume as the fuselage extends rearward above the wings, and the volume of the fuselage above the wings decreases as the fuselage extends rearward more than a volume of the fuselage rearwardly extending below the wings.

7. The aircraft of claim 6, wherein the wings include upwardly reflexed portions defined by cross sections of the wings running rearward along a flight direction of the aircraft, and the aircraft further comprises engines mounted under the wings behind the reflexed portions of the wings.

8. The aircraft of claim 7, wherein the engines comprise nacelle shrouds.

9. The aircraft of claim 8, wherein the nacelle shrouds are located behind the reflexed portions of the wings.

* * * * *

UNITED STATES PATENT AND TRADEMARK OFFICE
CERTIFICATE OF CORRECTION

PATENT NO.   : 6,588,703 B1
DATED        : July 8, 2003
INVENTOR(S)  : Tom Hartmann and John M. Morgenstern It is certified that error appears in the above-identified patent and that said Letters Patent is hereby corrected as shown below:

Title page,
Item [75], Inventor, please add inventor name -- John M. Morgenstern --

Drawings,
Fig. 6A and 6B, please delete the "Prior Art" legend as shown on the attached page.

Column 3,
Line 20, replace "seducing" with -- reducing --

Column 6,
Line 12, after the word "section", please add -- 102 --
Line 23, replace "edition" with -- reduction --
Line 54, please delete the word "an" and replace with the phrase -- a non-movable --
Line 54, after the word "portion" please add the phrase -- of the upper and lower wing surfaces --
Line 57, after the word "engine" please add the phrase -- with a nacelle --
Line 58, after the word "wing" please add the phrase -- , wherein the reflexed portion of the wing reduces nacelle shock. --

Column 7,
Line 6, after the word "wherein", please add the phrase -- the wings include a non-movable upwardly reflexed portion of the upper and lower wing surfaces defined by a cross-section of the wing running rearward along a flight direction of the aircraft wherein the reflexed portion of the wing reduces sonic boom, and --

Column 8,
Line 1, please delete the phrase "the wings include upwardly reflexed portions defined by cross sections of the wings, running rearward along a flight direction of the aircraft, and"

Signed and Sealed this

Eighteenth Day of November, 2003

JAMES E. ROGAN
*Director of the United States Patent and Trademark Office*